United States Patent
Benari et al.

(10) Patent No.: US 7,934,155 B2
(45) Date of Patent: Apr. 26, 2011

(54) METHOD AND ELECTRONIC DEVICE FOR REDUCING SIZE OF AN ELECTRONIC COLLECTION OF MEDIA ELEMENTS

(75) Inventors: Alon Benari, Shoresh (IL); Yaniv Axen, Tel Aviv (IL); Eran Vered, Ramat Gan (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1115 days.

(21) Appl. No.: 10/570,536

(22) PCT Filed: Aug. 31, 2004

(86) PCT No.: PCT/IB2004/051616
§ 371 (c)(1),
(2), (4) Date: Mar. 3, 2006

(87) PCT Pub. No.: WO2005/027527
PCT Pub. Date: Mar. 24, 2005

(65) Prior Publication Data
US 2007/0022216 A1   Jan. 25, 2007

(30) Foreign Application Priority Data
Sep. 12, 2003   (EP) .................................. 03103378

(51) Int. Cl.
*G06F 17/00* (2006.01)
(52) U.S. Cl. ........ 715/247; 715/200; 715/201; 715/202; 715/203; 715/204; 715/255; 715/273; 709/246; 709/247
(58) Field of Classification Search .......... 715/200–204, 715/255, 273; 709/246–247
See application file for complete search history.

(56) References Cited

U.S. PATENT DOCUMENTS

| | | | |
|---|---|---|---|
| 5,649,216 A * | 7/1997 | Sieber | 715/234 |
| 6,243,761 B1 | 6/2001 | Mogul et al. | |
| 6,345,279 B1 * | 2/2002 | Li et al. | 707/104.1 |
| 6,667,750 B1 * | 12/2003 | Halstead et al. | 715/788 |
| 6,970,602 B1 * | 11/2005 | Smith et al. | 382/232 |
| 2001/0034740 A1 * | 10/2001 | Kerne | 707/500.1 |
| 2002/0095439 A1 * | 7/2002 | Long et al. | 707/507 |
| 2002/0132608 A1 | 9/2002 | Shinohara | |
| 2003/0161542 A1 | 8/2003 | Ridge | |
| 2003/0172173 A1 * | 9/2003 | Fenton | 709/231 |

FOREIGN PATENT DOCUMENTS

| | | |
|---|---|---|
| EP | 0981231 A1 | 2/2000 |
| JP | 08116336 | 5/1996 |
| WO | WO03026331 A1 | 3/2003 |

OTHER PUBLICATIONS

Smith et al, "Scalable multimedia delivery for pervasive computing", published 1999, ACM, pp. 131-140.*
Mohan et al, "Adapting Multimedia Internet Content for Universal Access", published 1999, IEEE, pp. 1-11.*

* cited by examiner

*Primary Examiner* — Stephen S Hong
*Assistant Examiner* — David Faber
(74) *Attorney, Agent, or Firm* — Edward W. Goodman

(57) ABSTRACT

A method is used to reduce a size of an electronic collection of media elements (41, 43, 45). The method includes the steps of assigning a weight to each media element (41, 43, 45) in the collection and reducing size of the media elements (41, 43, 45) in dependency of a desired overall collection size reduction and the weight assigned to each media element (41, 43, 45). An electronic device includes logic circuitry operative to perform the method of the invention.

11 Claims, 4 Drawing Sheets

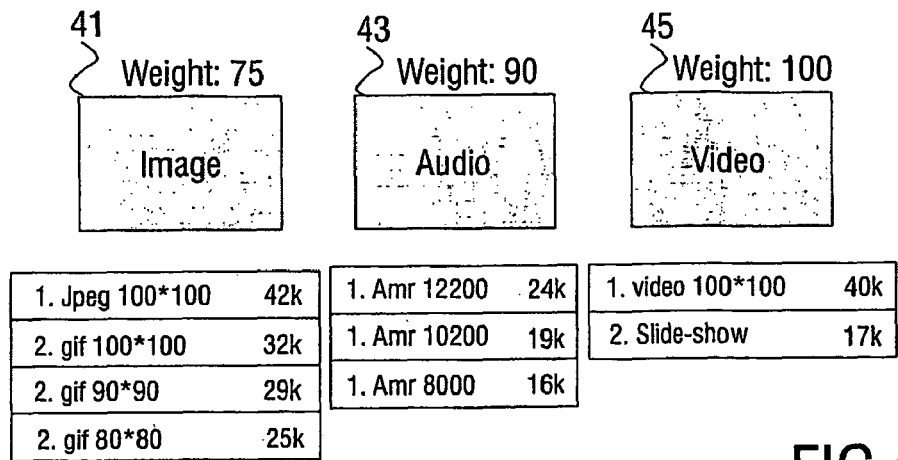
FIG.6
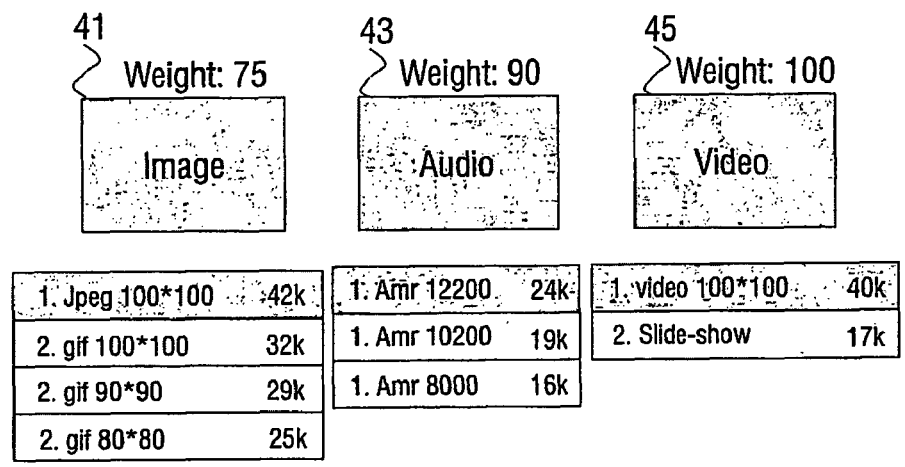
Size limit: 76k    Current Size: 106k    FIG.7
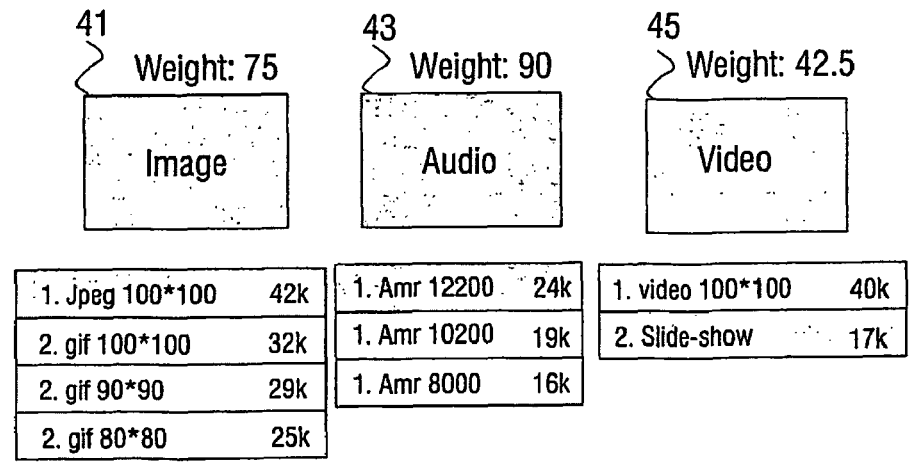
Size limit: 76k    Current Size: 83k    FIG.8

METHOD AND ELECTRONIC DEVICE FOR REDUCING SIZE OF AN ELECTRONIC COLLECTION OF MEDIA ELEMENTS

BACKGROUND OF THE INVENTION

1. Field of the Invention

The invention relates to a method of reducing size of an electronic collection of media elements, the electronic collection, e.g., a multimedia message, comprising a plurality of media elements.

The invention further relates to an electronic device for reducing size of an electronic collection of media elements, the electronic collection, e.g., a multimedia message, comprising a plurality of media elements.

The invention also relates to software for making a programmable device operative to perform a method of reducing size of an electronic collection of media elements, the electronic collection, e.g., a multimedia message, comprising a plurality of media elements.

2. Description of the Related Art

When sending Multimedia Messages between mobile phones, the Messages are adapted to the target device capabilities (e.g., image format conversion from GIF to JPEG). This adaptation is executed while user of the target device waits for the message to download to his mobile device. One of the challenges within these adaptation decisions is to fit to the limitations on the storage size of the target device. While some devices support a limit of 30 Kbyte other support up to a 100 Kbyte limit per message. A known method of reducing size of a multimedia message comprises removing the media elements that were added to the multimedia message last until the desired overall size reduction is achieved. Unfortunately, the multimedia messages created by the known method are often not representative of the multimedia message as its original creator originally intended it, because its overall quality has degraded too much.

SUMMARY OF THE INVENTION

It is a first object of the invention to provide a method of the kind described in the opening paragraph, which does not degrade the overall quality of the electronic collection of media elements as much.

It is a second object of the invention to provide an electronic device of the kind described in the opening paragraph, which does not degrade the overall quality of the electronic collection of media elements as much.

The first object is, according to the invention, realized in that the method comprises assigning a weight to each media element in the collection and reducing size of the media elements in dependency of a desired overall collection size reduction and the weight assigned to each media element. This method can be used to optimize the quality of the output media files of a multimedia message transcoder under the different constraints—mainly size limitation and device media capabilities. The method optimizes the trade-off between the different elements such that a whole message would appear optimal for the target device. This method can be used by every media storage application/appliance which has a size limit (e.g., Multimedia album, memory card for digital cameras, MMS legacy support). In the case a user reaches the limit of his/her storage, he/she may be able to execute a "compress" function that would "free" space while minimally reducing the quality. This method can also be used by WEB/WAP sites to optimize bandwidth and match device capabilities when surfing the site. The weights may be, for example, specified by an operator. Instead of or in addition to allowing an operator to specify weights per media type, a user creating an electronic collection may be able to specify a weight per media element. This weight may, for example, be embedded as meta-data in an XML document.

The step of reducing size of the media elements may comprise generating a prioritized list of alternative outputs for the media elements, estimating a size of each of the alternative outputs, selecting a combination of alternative outputs that achieves the desired overall collection size reduction while taking into account the weights assigned to each media element and the priority of the alternative outputs, and converting the electronic collection of media elements based on the selected combination of alternative outputs.

Selecting a combination of alternative outputs may comprise selecting a next alternative output in the prioritized list of alternative outputs of the media element with the smallest weight and increasing said smallest weight proportionally to the estimated size reduction resulting from said next alternative output selection until the desired overall collection size limit is reached.

The overall size reduction of the electronic collection can be recalculated every time a new size of a media element is known. The new size of the media element can, after it has been determined, be subtracted from the overall collection size (and thus the remaining desired collection size reduction becomes smaller) after which the weight of that media element is no longer used to determine a size reduction for next media elements, i.e., is no longer part of the sum. In this embodiment, it is advantageous to start determining parameters and new sizes for the largest media elements and end for the smallest media elements. The new overall size of the electronic collection will then likely be close to the maximum electronic collection size. Alternatively, by starting determining parameters and new sizes for media elements having the highest weight, preferred media elements may have an additional advantage (if the new size of the media element estimated for certain parameters is equal or lower than the desired size of the media element).

Another embodiment of the invention comprises assigning low weights to preferred media elements, determining a size reduction for each media element by dividing the weight of each media element by the sum of all weights and multiplying this number with the desired overall collection size reduction, and determining output parameters by looking up in a table which new size estimated for certain parameters approximates the desired size of the media element (e.g., is equal or lower), the desired size being the original size reduced by the determined size reduction.

The second object is, according to the invention, realized in that the electronic device comprises electronic circuitry, the electronic circuitry functionally comprising a weight assigner operative to assign a weight to each media element in an electronic collection of media elements, the electronic collection comprising a plurality of media elements and a size reducer operative to reduce size of the media elements in dependency of a desired overall collection size reduction and the weight assigned to each media element.

BRIEF DESCRIPTION OF THE DRAWINGS

These and other aspects of the method and the electronic device of the invention will be further elucidated and described with reference to the drawings, in which:

FIG. 6 illustrates a fourth step performed by the favorable embodiment;

FIG. 7 illustrates a fifth step performed by the favorable embodiment;

FIG. 8 illustrates a sixth step performed by the favorable embodiment;

Corresponding elements within the drawings are identified by the same reference numeral.

DESCRIPTION OF THE PREFERRED EMBODIMENTS

Figure 1:
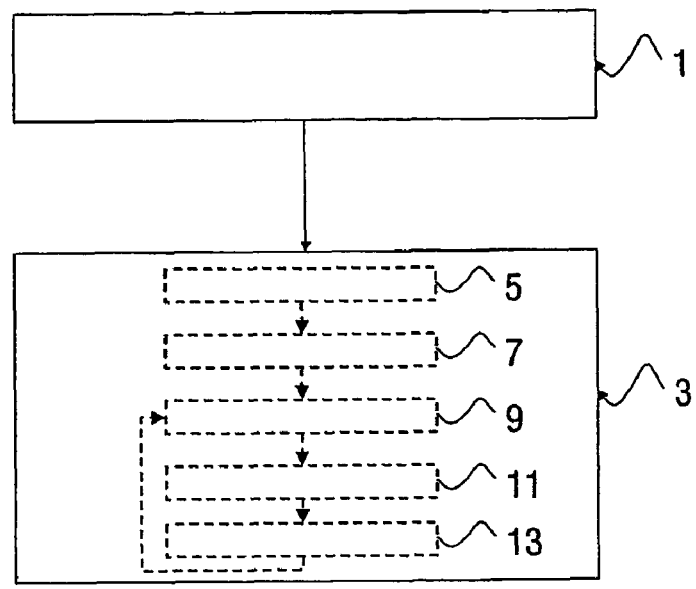
FIG. 1 is a flow diagram of the method of the invention.

The method of the invention, see FIG. 1, comprises a step 1 of assigning a weight to each media element in the collection and a step 3 of reducing size of the media elements in dependency of a desired overall collection size reduction and the weight assigned to each media element.

Step 3 may comprise a step 5 of generating a prioritized list of alternative outputs for the media elements, a step 7 of estimating a size of each of the alternative outputs, a step 9 of selecting a combination of alternative outputs that achieves the desired overall collection size reduction while taking into account the weights assigned to each media element and the priority of the alternative outputs, and a step 11 of converting the electronic collection of media elements based on the selected combination of alternative outputs.

Step 9 may comprise performing the steps of selecting a next alternative output in the prioritized list of alternative outputs of the media element with the smallest weight and increasing said smallest weight proportionally to the estimated size reduction resulting from said next alternative output selection until the desired overall collection size limit is reached.

Figure 3:
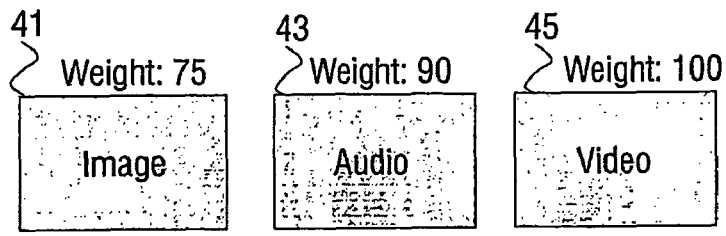
FIG. 3 illustrates a first step performed by a favorable embodiment of the method of the invention.

A favorable embodiment of the method of the invention is shown in FIGS. 3-11. In FIG. 3, a weight is assigned to each media element (image 41, audio 43 and video 45), signifying the relative importance/compromise in the output multimedia message (step 1). In case the overall size limit is not reached, some of the media elements should be compressed (with lower quality) or even dropped. Each media element has a weight. Media elements with lower weights will be the first ones to be compressed/dropped, and media elements with higher weights will be the last ones. An element's weight is updated during the optimization process relatively to file size reduction already achieved, thus allowing an even distribution of size reduction between the different elements (relative to their weights).

The weights may, for example, be assigned by the operator of the system (e.g., the Network Operator), through a configuration file, to reflect his/her preferences for the importance of the different media elements, and for the willingness to compromise on the quality of different media elements. For example: video=100, image=50, audio=10.

Figure 4:
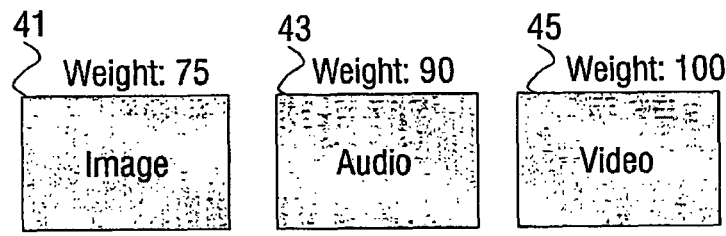
FIG. 4 illustrates a second step performed by the favorable embodiment.

In FIG. 4, a prioritized list of alternative outputs is generated for each media element according to preferences from the operator/MMSC vendor/end-user (step 5). The prioritization can, for example, be configured by the operator of the transcoding system (e.g., the Network Operator), through a configuration file. For example, for image transcoding the operator may specify the following options (prioritized from first to last):

Transcode to JPEG with the original dimensions and original color depth.

Transcode to GIF with the original dimensions.

Transcode to JPEG and cut dimensions by half, and leave original color depth.

Transcode to JPEG and cut dimensions by half, and use grayscale colors.

Delete the image.

The device parameters can be also used in the options. For example:

Resize the image to the device dimensions.

Resize the image to half the device dimensions.

In addition or instead of media format, resolution (dimension) and color-depth, other parameters may be specified. Parameters may, for example, be:

Visual: Resolution (width, height), Frame-rate, and Color-scheme

Audio: Sampling resolution, Sampling Frequency, and Number of channels

General: Bit-rate, Codec, Format, Duration, and Quality factor.

Figure 5:
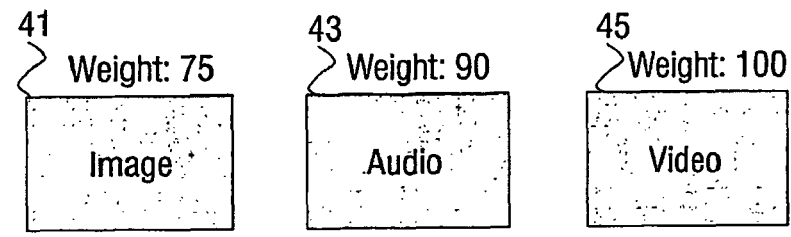
FIG. 5 illustrates a third step performed by the favorable embodiment.
Figure 9:
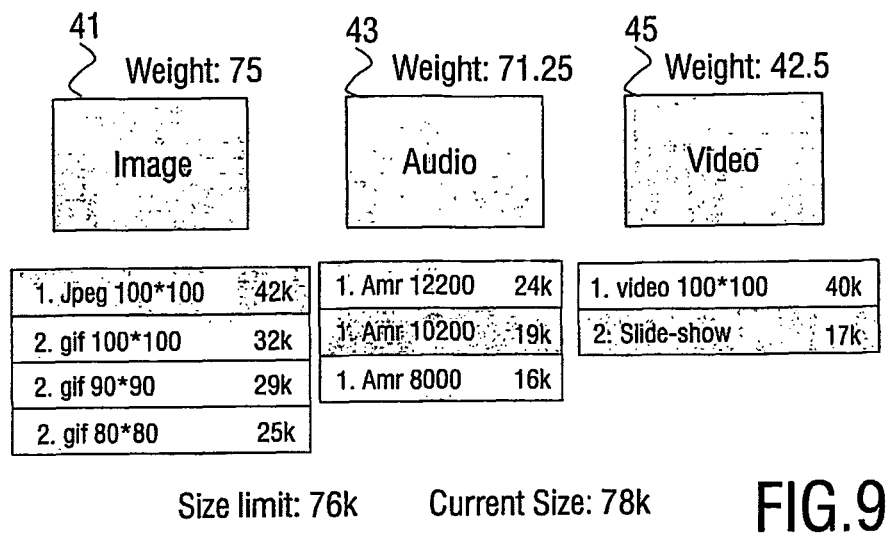
FIG. 9 illustrates a seventh step performed by the favorable embodiment.
Figure 10:
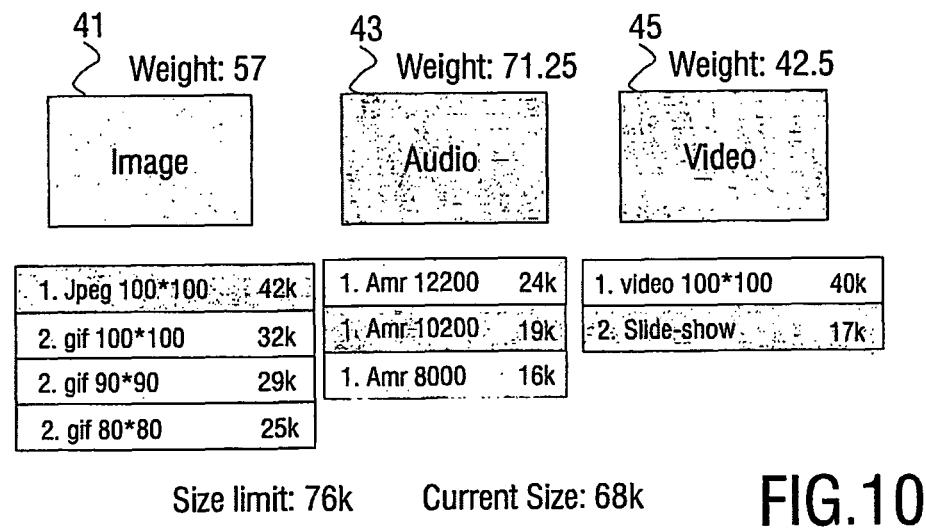
FIG. 10 illustrates an eight step performed by the favorable embodiment.
Figure 11:
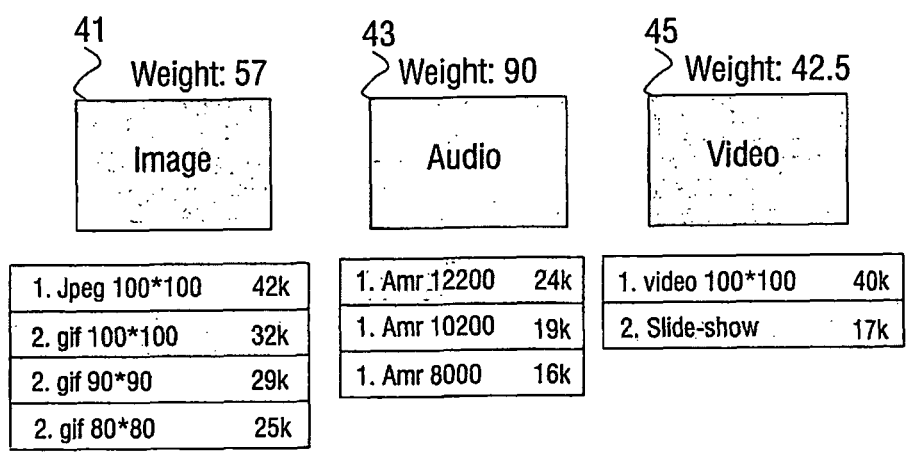
FIG. 11 illustrates a ninth step performed by the favorable embodiment.

In FIG. 5, for each alternative, a size estimation is calculated using a statistical algorithm (step 7). The media file size estimation algorithm may be based on:

Different media format properties.

Statistical information collected for a sample set of media and analyzed separately according to the different attributes of each media.

Learning mechanism that collects new information while the system is running and adapts the estimations accordingly.

In FIG. 6, a step is shown in which alternative outputs are removed and the lists of alternative outputs are sorted. If alternative outputs that are not supported by a user's device have not already been removed, they may be removed in this step. The list of alternative outputs may be sorted according to size. An output alternative that is larger in size and also has a worse quality than another output alternative, may be removed.

In FIGS. 7-11, a set of optimal parameters is selected for each media file (step 9). This is accomplished by selecting the best combination of alternative outputs that complies with the size limit, according to the weights from step 1:

a. As long as the size limit is not reached:

Compress the media element/s with the smallest weight, that is move to the next priority (a worse priority) for this media element.

Increase the weight of this/these elements respectively to the compression ratio.

b. If any of the media elements can be improved (moved to the previous priority a better one) without exceeding the size limit, then do it for the one with the highest weight (and update its weight), iteratively, until no improvement can be done.

If an image size is reduced from 80K to 20K (4 times smaller) then the weight of the image is increased by 4 times (e.g., from 50 to 200). This way the damage for every media element (that is either quality decrease or deletion) is proportional to its weight (the bigger the weight, the smaller the damage is).

After selection of the parameters, the media files are converted according to the selected parameters (step 11). In case the overall output message size exceeds the size limit (due to statistical inaccuracies in the size estimations), another iteration is executed after recalibrating the size estimations according to the actual file sizes. The method may comprise a step 13, see FIG. 1, to compare the overall output message size with the size limit. If the difference is too large, the method may return to step 9.

Figure 2:
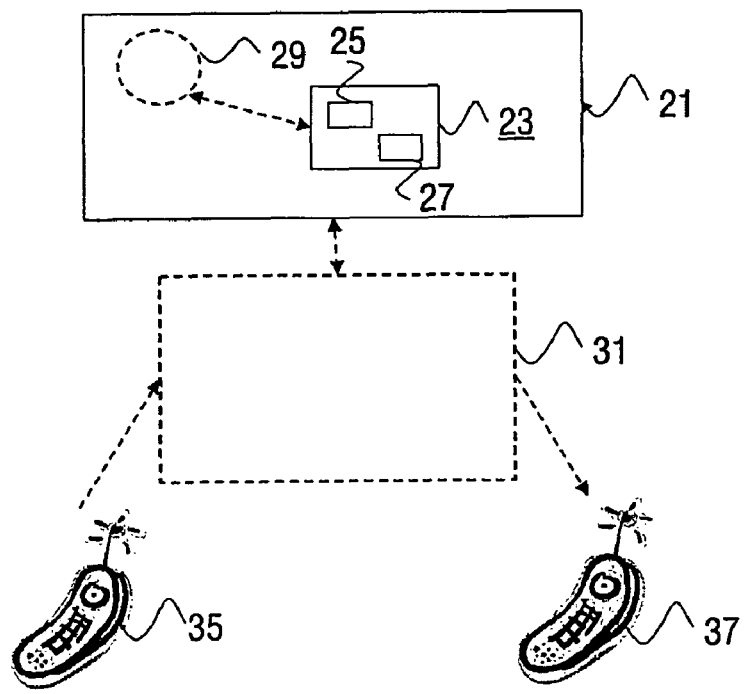
FIG. 2 is a block diagram of the electronic device of the invention.

The electronic device 21 of the invention, see FIG. 2, comprises electronic circuitry 23. The electronic circuitry 23 functionally comprises a weight assigner 25 and a size reducer 27. The weigh assigner 25 is operative to assign a weight to each media element in an electronic collection of media elements, the electronic collection comprising a plurality of media elements. The size reducer 27 is operative to reduce size of the media elements in dependency of a desired overall collection size reduction and the weight assigned to each media element.

The electronic device 21 may be, for example, a transcoder (server) or a digital camera. The logic circuitry 23 may be, for example, a general-purpose CPU (e.g., an AMD Athlon or Intel Pentium CPU) operative to run computer programs. Favorably, the weight assigner 25 and the size reducer 27 are functional components of a computer program. The electronic device 21 may comprise a storage means 29. The storage means 29 may comprise, for example, one or more hard disks and/or one or more optical discs. The storage means 29 may comprise, for example, an electronic collection of media elements before it was processed, an electronic collection of media elements after it was processed, and/or cached media elements that were previously transcoded. The electronic device 21 may be coupled to a message server 31 which controls the electronic device 21 (which is for example a transcoder server). An owner of a mobile phone 35 may send multimedia messages to an owner of a mobile phone 37 via the message server 31.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Software' is to be understood to mean any software product stored on a tangible computer-readable storage medium, such as a floppy disk, or any software product downloadable via a network, such as the Internet, or marketable in any other manner.

The invention claimed is:

1. A method of reducing size of an electronic collection of media elements, the electronic collection comprising a plurality of media elements, the method comprising the steps of:
    assigning a weight to each media element in the collection; and
    reducing size of the media elements in dependency of an desired overall collection size reduction and the weight assigned to each media element, wherein reducing size of the media elements comprises
    generating a prioritized list of alternative outputs of various compressions for each of the respective media elements,
    estimating a size of each of the alternative outputs, and
    selecting a combination of alternative outputs, corresponding to one alternative output per media element, that achieves the desired overall collection size reduction while taking into account (i) updates to the weights assigned to each media element relative to a file size change achieved via a corresponding selected alternative output and (ii) a priority of the selected alternative outputs of each of the respective media elements, wherein said method further comprises the step of:
    subsequent to reaching a size limit that achieves the desired overall collection size reduction, determining if any of the media elements are improvable by moving to a previous priority alternative output;
    if so, moving to a previous priority alternative output for the media element with the highest weight and update its weight, and iteratively repeating, until no further improvement is achievable.

2. The method as claimed in claim wherein the electronic collection is a multimedia message.

3. The method as claimed in claim 1, wherein said method further comprises the step of:
    converting the electronic collection of media elements based on the selected combination of alternative outputs.

4. The method as claimed in claim 3, wherein said step of selecting the combination of alternative outputs comprises:
    selecting, for the media element with the highest weight, a next alternative output in the prioritized list of alternative outputs of the respective media element;
    updating the weight of the respective media element proportionally to the estimated size reduction resulting from said selected next alternative output selection; and
    repeating the selecting and updating, iteratively, until the desired overall collection size limit is reached.

5. A tangible computer-readable storage medium encoded with a computer program configured to be executed by a processor for making the processor operative to perform the method of claim 1.

6. An electronic device configured for reducing size of an electronic collection of media elements, the electronic device comprising:
    a weight assigner operative to assign a weight to each media element in an electronic collection of media elements, wherein the electronic collection comprises a plurality of media elements; and
    a size reducer operative to reduce size of the media elements in dependency of a desired overall collection size reduction and the weight assigned to each media element, wherein reducing size of the media elements comprises:
    generating a prioritized list of alternative outputs of various compressions for each of the respective media elements,
    estimating a size of each of the alternative outputs,
    selecting a combination of alternative outputs, corresponding to one alternative output per media element, that achieves the desired overall collection size reduction while taking into account (i) updates to the weights assigned to each media element relative to a file size change achieved via a corresponding selected alternative output and (ii) a priority of the selected alternative outputs of each of the respective media elements, wherein the size reducer is further operative to query, subsequent to reaching a size limit that achieves the desired overall collection size reduction, determining if any of the media elements are improvable upon by moving to a previous priority alternative output, and if so, moving to a previous priority alternative output for the media element with the highest weight and update its weight, iteratively, until no further improvement is achievable.

7. The method as claimed in claim 1, wherein updates to the weights assigned to each media element are with respect to a corresponding compression ratio resulting from a compression of a corresponding media element through the selection of a next priority alternative output for the given media element.

8. The electronic device as claimed in claim 6, wherein the electronic collection is a multimedia message.

9. The electronic device as claimed in claim 6, wherein the size reducer is operative to convert the electronic collection of media elements based on the selected combination of alternative outputs.

10. The electronic device as claimed in claim 9, wherein the size reducer is further operative to (i) select, for the media element with the highest weight, a next alternative output in the prioritized list of alternative outputs of the respective media element, (ii) update the weight of the respective media element proportionally to the estimated size reduction resulting from the selected next alternative output selection; and (iii) repeat the selecting and updating, iteratively, until the desired overall collection size limit is reached.

11. The electronic device as claimed in claim 6, wherein updates to the weights assigned to each media element are with respect to a corresponding compression ratio resulting from a compression of a corresponding media element through the selection of a next priority alternative output for the given media element.

* * * * *